3,206,473
SULFOLANYLALKANOIC ACIDS AND
ESTERS THEREOF
Herman E. Faith, Indianapolis, Ind., assignor to The Dow
Chemical Company, Midland, Mich., a corporation of
Delaware
No Drawing. Filed Sept. 10, 1962, Ser. No. 222,672
10 Claims. (Cl. 260—332.1)

The invention relates to novel organic compounds and more particularly relates to fatty acids and esters thereof having a sulfolanyl group substituted in the alkyl group attached to the carboxylate carbon, or, having the sulfolanyl group attached to the carboxylate carbon. The compounds may be prepared by reacting unsubstituted malonic ester with 3-sulfolanyl bromide in the presence of sodium ethylate and ethanol. The α-alkyl substituted malonic ester may be prepared from the foregoing ester by alkylation with the appropriate alkyl iodide in the presence of sodium ethylate. The corresponding dicarboxylic acids are obtained by saponification of these esters.

The α-sulfolanyl substituted acetoacetic ethyl ester may be obtained, for example, by the reaction of the unsubstituted acetoacetic ethyl ester with 3-sulfolanyl bromide in the presence of sodium ethylate and ethanol.

The α-phenyl-3-sulfolanyl malonic ester, on the other hand, may be prepared by addition of α-phenyl malonic ester to either of α-sulfolene or β-sulfolene as follows:

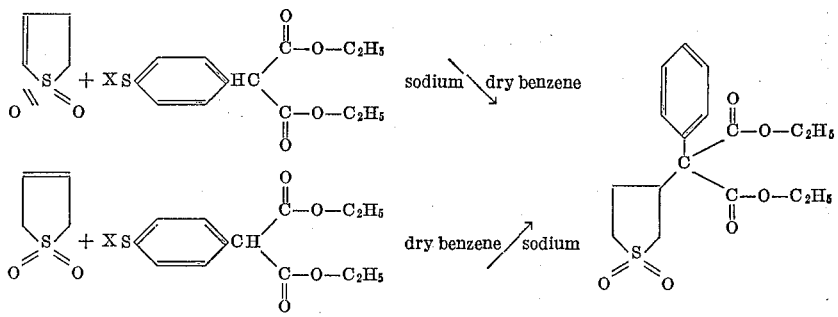

sulfolanyl group specifically employed is 3-sulfolanyl, illustrated as follows:

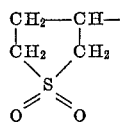

The present compounds may be represented by the following structural formula:

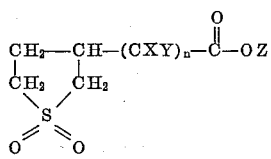

wherein
X=H, phenyl, acetyl or lower alkyl group having 1–4 carbon atoms, $$Y=H, -\overset{O}{\underset{}{C}}-OH, -\overset{O}{\underset{}{C}}-O-CH_3 \text{ and } -\overset{O}{\underset{}{C}}-O-C_2H_5$$

n=0 or 1
Z=H, methyl, or ethyl.

The present compounds are, with few exceptions, crystalline solids which are moderately soluble in most of the more polar organic solvents and from low to moderate solubility in water. By low to moderate solubility in water is meant having a solubility of from about 1–2 grams to 10–12 grams per 100 grams of water. Some lower molecular weight esters of the invention are liquids at ambient room temperature.

The compounds are adapted to be employed as active toxicants in compositions for the control of internal parasites in warm blooded animals, especially the helminths which invade the intestinal tract. The compounds are also generally useful as intermediates in the preparation of other acids and esters containing the 3-sulfolanyl group.

The compounds of the invention may be prepared in various ways as desired. The 3-sulfolanyl malonic ester Reaction is generally brought about by heating the reactants in anhydrous organic solvent medium, e.g., ethanol, benzene, xylene or methyl ethyl ketone, at the reflux temperature for a number of hours or days. Generally, stoichiometric amounts of the reactants may be used.

Upon completion of the reaction, the reaction product is separated from the solvent medium as by distillation of the solvent or filtration of the product if the product is a crystalline solid at this point. The oily or solid product recovered is usually purified by recrystallization from ethereal or aqueous solution. If the product is a liquid, it may be purified by distillation under reduced pressure conditions.

The α-substituted acetic esters are conveniently prepared from the corresponding malonic esters by heating, as in an acidic medium to bring about decarboxylation.

The α-substituted acetic acids are obtained from these acetic esters by saponification in alkaline aqueous medium, followed by acidification. While some of the substituted malonic esters, e.g., α-phenyl esters, decarboxylate readily during room temperature saponification and acidification steps, others are more stable and require heating the ester, as in a saponification mixture, to obtain decarboxylation.

The following examples serve to illustrate the invention and are not to be construed as limiting.

*Example 1.—Diethyl 3-sulfolanylmalonate*

Method A.—Eleven grams (0.479 gram-atom) of sodium was dissolved in 280 milliliters of absolute ethanol. To the solution was added 77 grams (0.478 mole) of diethyl malonate. 3-bromosulfolane, suspended as a melt in 150 milliliters of warm absolute ethanol, was added by dropping funnel to the stirred, refluxing solution over a 1-hour period. Refluxing was continued for 10 minutes after the addition; then the neutral mixture was cooled, filtered to remove sodium bromide, and concentrated under reduced pressure. The residue was dissolved in 200 milliliters of benzene, washed with water, and benzene and ethyl malonate were removed under reduced pressure, the pot temperature finally being raised to 135°. The residue, consisting of diethyl 3-sulfolanylmalonate, was recrystallized from ether and found to exhibit a melting temperature of 65–66° C. The 88.4 grams of purified product obtained represented a yield of 66 percent.

*Method B.*—The same compound was obtained in 87 percent yield by the reaction in benzene of α-sulfolene, sodium granules and diethyl malonate.

*Example 2.—Diethyl α-ethyl-3-sulfolanylmalonate*

Sodium ethoxide was prepared by reacting 0.577 gram of sodium metal with 30 milliliters of absolute ethanol after which the excess unreacted ethanol was distilled off at reduced pressure. To the sodium ethoxide residue was added 7 grams of diethyl 3-sulfolanylmalonate and 33 milliliters of diethyl carbonate and the whole was subjected to distillation at 100 mm. pressure until 7 milliliters of distillate was removed. Then 10 milliliters (19 grams) of ethyl iodide was added to the reaction mixture, 2.5 grams initially and the remainder portionwise over a 13-hour period during which the reaction mixture was stirred and maintained at a temperature of 90° C. After the reaction mixture had been allowed to cool, it was made approximately neutral with acetic acid and water was added to take up solid sodium iodide. The water insoluble phase was diluted with ether and separated from the aqueous phase. The ether solution was dried with magnesium sulfate and concentrated in vacuo. The residue was crystallized from aqueous ethanol solution to obtain a 76 percent yield of purified diethyl α-ethyl-3-sulfolanylmalonate product melting at 57–58° C.

In a manner similar to the foregoing example, diethyl α-methyl-3-sulfolanymalonate is prepared using methyl iodide in place of the ethyl iodide in the example.

*Example 3.—Diethyl α-butyl-3-sulfolanylmalonate*

This was made by a procedure similar to the one described in Example 2 for producing the corresponding α-ethyl compound, except that after the reaction mixture consisting of sodium ethoxide, diethyl carbonate and diethyl 3-sulfolanylmalonate had stirred for 8 hours at 95°, 1-bromobutane (instead of ethyl iodide), in 50 percent excess, was added and heating continued for a total of 24 hours.

In a manner similar to the foregoing example, diethyl, α-n-propyl-3-sulfolanylmalonate is prepared using 1-bromopropane in place of the 1-bromobutane in the example.

*Example 4.—Diethyl α-phenyl-3-sulfolanylmalonate*

To 4.42 grams (0.192 gram-atom) of sodium granules in 50 milliliters of xylene were added 600 milliliters of anhydrous benzene and 90.8 grams of redistilled diethyl phenylmalonate. As the evolution of hydrogen subsided, the mixture was heated with stirring at 50° for 2 hours to dissolve most of the sodium. The addition of 24.6 grams (0.208 mole) of dry α-sulfolene caused the remainder of the sodium to dissolve. The solution was stirred at 45° C. for 3 days, then neutralized with hydrochloric acid, washed with water and dried. Benzene and unreacted ester were removed by vacuum distillation and the pot residue was recrystallized from anhydrous ether containing ligroin, giving 48 grams of diethyl α-phenyl-3-sulfolanylmalonate product, exhibiting a melting temperature of 60–62° C. The yield was 67 percent.

In a manner similar to the foregoing Examples 1 to 4, the corresponding methyl esters are prepared using dimethyl malonate as a starting material in place of diethyl malonate, and dimethyl phenylmalonate in place of diethyl phenylmalonate.

*Example 5.—Ethyl α-acetyl-3-sulfolanylacetate*

Condensation of ethyl acetoacetic ester with α-sulfolene (90 grams) was accomplished by the method of Example 4. The ester product was recrystallized from absolute ethanol-ligroin mixture. The so-prepared ethyl α-acetylsulfolanylacetate was obtained in 61 percent yield and melted at 103–105° C.

In a manner similar to the foregoing example, methyl α-acetyl-3-sulfolanylacetate is prepared using methyl acetoacetate in place of ethyl acetoacetate.

*Example 6.—3-sulfolanylcarboxylic acid*

α-Sulfolene (75.6 grams, 0.64 mole) and 45.3 grams (0.69 mole) of finely ground potassium cyanide, both dried over concentrated sulfuric acid, were refluxed and stirred for 10 hours with 71 grams (0.7 mole) of methyl ethyl ketone cyanhydrin in 400 milliliters of dry methyl ethyl ketone. Potassium cyanide was removed by filtration, and the solution acidified with acetic acid, chilled and filtered to remove crystals. Concentration of the filtrate yielded additional crystals which were washed with water. There was obtained 61.1 grams of the carbonitrile which was recrystallized from absolute ethanol. The nitrile (61.1 grams, 0.42 mole) was refluxed for 2.5 hours in 300 milliliters of 20 percent hydrochloric acid. Concentration of the solution to dryness in vacuo gave a solid which was dried over sodium hydroxide. The desired product was selectively extracted from the dried solid with hot acetone. Evaporation of the acetone solution yielded 65.5 grams of a white solid which was recrystalized from toluene-ethyl acetate solution. The so-purified 3-sulfolanylcarboxylic acid melted at 141–142° C. and was obtained in 95 percent yield.

*Example 7.—3-sulfolanyl malonic acid*

The diethyl ester of 3-sulfolanylmalonic acid (387.2 grams, 139 moles) was refluxed for 1.5 hours with 1800 milliliters (4.48 moles) of 2.5 N sodium hydroxide solution. The solution was chilled and gradually acidified with good stirring with an equivalent amount of hydrochloric acid (d. 1.19). It was then concentrated to dryness under reduced pressure at 60°. The residue was taken up with hot acetone and filtered to remove sodium chloride. The filtrate was evaporated to dryness and the residue washed with ether to yield 296.7 grams of white crystals of 3-sulfolanylmalonic acid melting at 165° C.

*Example 8.—3-sulfolanylacetic acid*

Decarboxylation of 297 grams of the sulfolanyl malonic acid was accomplished by heating at 155° in vacuo with ground glass until carbon dioxide evolution ceased (2.25 hours). An analytical sample was recrystallized from toluene-ethyl acetate solution without change in melting point (88–90° C.).

*Example 9.—Ethyl 3-sulfolanyl acetate*

A 238-gram portion of 3-sulfolanyl acetic acid was dissolved in 1100 milliliters of absolute ethanol, then the solution was saturated with hydrogen chloride, and the mixture refluxed for three hours. The sirup obtained by concentrating the reaction mixture under reduced pressure was dissolved in ether, dried, and fractionally distilled, yielding 240 grams of the ester product.

In a manner similar to the foregoing example, 3-sulfolanylacetic acid is esterified with methanol instead of ethanol.

*Example 10.—α-Phenyl-3-sulfolanylacetic acid*

The diethyl phenylmalonate (31.7 grams, 0.089 mole) was refluxed for 2.5 hours with 142 milliliters (0.355 mole) of 2.5 N sodium hydroxide. The solution was cooled to 30–35° C. and acidified with an excess of hydrochloric acid (d. 1.19). The solution effervesced and gave a gummy precipitate which was separated from the solution by decantation. The precipitate was boiled 10–15 minutes with hot water containing some hydrochloric acid while effervescence continued, filtered, and stirred as the filtrate cooled. Solidification of a precipitate took place slowly. An additional amount of product (about 50% more) was obtained by concentration of the filtrate and treating the concentrate with 71 milliliters of 2.5 N sodium hydroxide as was originally done. The combined products were washed with ether to remove some impurities and recrystallized from water; yield, 10.16 grams of α-phenyl-3-sulfolanylacetic acid.

*Example 11.—Ethyl α-phenyl-3-sulfolanylacetate*

A 28.4-gram quantity of α-phenyl-3-sulfolanylacetic acid was esterified by refluxing it for 3 hours in 190 milliliters of absolute ethanol containing 33 grams of hydrogen chloride.

In administering a compound of the invention as an active toxicant for the control of helminths, the compound may be administered in a number of ways, e.g., in daily dosage amounts in gelatin capsules, or the compound may be incorporated in the drinking water or the feed diet of the animal. Feed compositions are generally prepared to contain from about 0.01 to 1 percent by weight of one of the present compounds.

In representative operations, mice naturally infested with tapeworms were fed a diet containing 0.06 percent by weight of 3-sulfolanylmalonic acid. At the end of a one-week test period, necropsy showed complete clearance of tapeworms.

In further operations, mice naturally infested with pinworms were fed a diet containing 0.06 per cent by weight of ethyl α-acetyl-3-sulfolanylacetate. At the end of a one-week test period, necropsy showed complete clearance of pinworms.

Among the more useful groups of the compounds of the invention are 3-sulfolanylacetic acid and its methyl and ethyl esters, 3-sulfolanyl-acetoacetic acid and its methyl and ethyl esters, and the alkyl-3-sulfolanylmalonic acids and the methyl and ethyl esters thereof.

I claim:
1. A compound having the formula

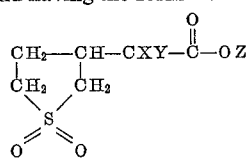

wherein
X is a member of the group consisting of H, phenyl, acetyl and lower alkyl containing 1–4 carbon atoms;
Y is a member of the group consisting of

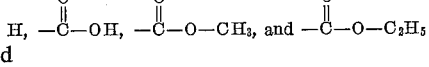

and
Z is a member of the group consisting of H, methyl and ethyl.
2. α-Alkyl substituted 3-sulfolanyl malonic acid, wherein the α-alkyl contains 1 to 4 carbon atoms.
3. 3-sulfolanylmalonic acid.
4. 3-sulfolanylacetic acid.
5. α-Phenyl-3-sulfolanylacetic acid.
6. The dimethyl ester of α-alkyl-3-sulfolanylmalonic acid wherein α-alkyl contains 1–4 carbon atoms.
7. The diethyl ester of α-alkyl-3-sulfolanylmalonic acid wherein α-alkyl contains 1–4 carbon atoms.
8. Ethyl 3-sulfolanylacetate.
9. The ethyl ester of α-phenyl-3-sulfolanylacetic acid.
10. Ethyl α-acetyl-3-sulfolanylacetate.

References Cited by the Examiner

Kurtz: Chemical Abstracts, vol. 45 (1951), page 9461.

WALTER A. MODANCE, *Primary Examiner.*
NICHOLAS S. RIZZO, *Examiner.*